Nov. 11, 1969 J. J. DEMPSEY ET AL 3,478,141
PROCESS FOR TREATING FILM-FIBRIL SHEETS
Filed Aug. 29, 1966 2 Sheets-Sheet 1

INVENTORS
JAMES JOSEPH DEMPSEY,
CHI-CHANG LEE,
BY
Eugene Berman
AGENT

INVENTORS
JAMES JOSEPH DEMPSEY,
CHI-CHANG LEE,
BY Eugene Berman
AGENT

United States Patent Office 3,478,141
Patented Nov. 11, 1969

3,478,141
PROCESS FOR TREATING FILM-FIBRIL SHEETS
James Joseph Dempsey and Chi-Chang Lee, Richmond, Va., assignors to E. I. du Pont de Nemours and Company, Wilmington, Del., a corporation of Delaware
Filed Aug. 29, 1966, Ser. No. 575,843
Int. Cl. B29c *17/02*
U.S. Cl. 264—284                                       3 Claims

ABSTRACT OF THE DISCLOSURE

A process for embossing film-fibril sheets by exposing them to heat and pressure between a pair of rolls, one of the rolls having a heat conductive surface of a specified number of bosses extending from the surface of the roll and the other roll having a resilient surface. Sufficient heat and pressure is provided by the rolls to form translucent windows directly beneath the bosses while at the same time lightly bonding the film-fibrils in the remaining areas of the sheet without fusing them.

---

This invention relates to a hot embossing apparatus and process for improving the delamination and abrasion resistance of a non-woven fibrous sheet while retaining the softenability of the sheet. The invention further concerns the product produced thereby.

Recently methods have become available for preparing non-woven sheets from continuous networks of film-fibril elements. The sheets may be prepared, for example, by fibrillating an oriented polymeric film to form a network and then laminating together several layers with fibrils oriented in different directions in the various layers. In another method described in U.S. Patent 3,081,519 to Blades and White, a solution of polymer is flash-spun at a temperature above the boiling point of the solvent and at high pressure into a low pressure area, whereupon a three-dimensional network of film-fibrils forms at the spinneret. The network is spread by means of a baffle and is then collected in multidirectional, overlapping, and intersecting arrangement on a moving belt. The sheet is finally consolidated by passing through a pair of cold rolls. The preparation of this sheet is described in U.S. Patent 3,169,899 to Steuber.

The processing of sheets made from film-fibril networks to obtain improved textile quality has been the subject of much research. In general, these processes have given improved sheets with high abrasion resistance and high delamination resistance but with high stiffness. The improved products, however, were not readily softenable by mechanical or other means. Other processes, were, of course, available for making soft or softenable products but these products were deficient in abrasion resistance, delamination resistance, or both.

The object of the present invention is to provide an apparatus and process for treating a non-woven film-fibril sheet to develop a sheet with a high resistance to abrasion, high resistance to delamination, and high softenability. Other objects will be seen hereinafter.

The above objects are provided by the present invention which comprises embossing a film-fibril sheet having a surface area of at least 2 m.²/g. and an overall density of 0.1 to 0.4 g./cm.³ by exposing it to heat and pressure between a pair of rolls of specific construction. One roll has a heat-conductive surface with 30 to 170 hard bosses/cm.² which extend from the surface of the roll to a height at least 2.5 times the thickness of the sheet. The bosses have a total cross-sectional area measured at the base of the bosses equivalent to 1 to 5% of the fabric area. The opposing roll has a resilient surface with a durometer hardness between 60 and 90. Sufficient heat is provided through the heat conducting roll and sufficient pressure is provided between the rolls to fuse the film fibrils together on the surface areas of the sheet to form translucent windows directly beneath the tapered points and at the same time to lightly bond the film-fibrils in the remaining areas of the sheet without fusing them.

The invention will be more fully described with reference to the following figures.

Figure 1:
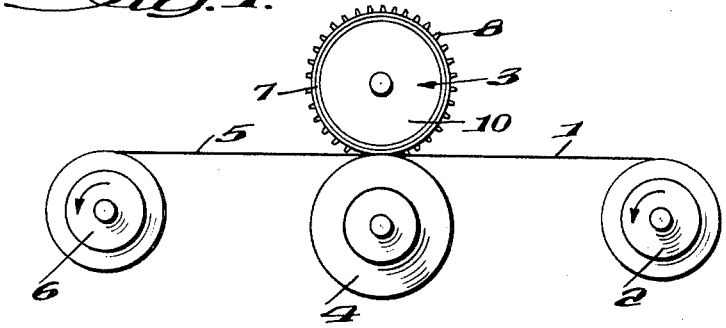
FIGURE 1 is an end view of apparatus suitable for embossing the film-fibril sheet.

In FIGURE 1 film-fibril sheet material 1 is provided from roll 2. The sheet material is generally in the range of 0.07 to 0.40 mm. in thickness. It is passed between the driven pair of rolls 3 and 4 to provide an embossed sheet 5 which is wound up on roll 6. The embossing roll 3 has a heat-conducting surface 7 which may be integral with roll 3 or may be a separate piece. Raised bosses 8 impress a pattern upon the film-fibril sheet as it passes between rolls 3 and 4. Roll 3 is driven by means not shown. The surface of resilient roll 4 has a durometer hardness between 60 and 90. Steam under regulated pressure is provided for a hollow chamber 10 in embossing roll 3. The temperature of the roll surface is controlled by regulation of steam pressure in the chamber 10.

Figure 2:
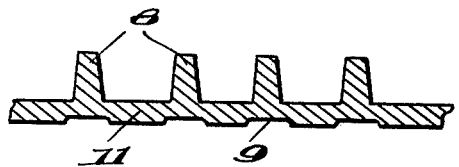
FIGURE 2 is a cross-sectional view of a section of a copper shell mounted on the surface of embossing roll 3 of FIGURE 1 and having a satisfactory surface for use in the process of the invention.
Figure 3:
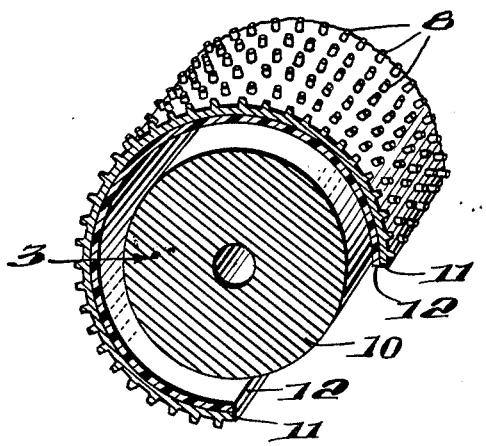
FIGURE 3 is a perspective view of a copper shell and a cylindrical roll showing application of this shell to the roll.

In FIGURE 2 a copper shell 11 is shown having bosses 8 of tapered construction. Before operation of the process the shell is fastened to the cylindrical surface of embossing roll 3 shown in FIGURE 1. In FIGURE 3 the copper shell 11 is shown being attached to roll 3 by means of a heat-resistant adhesive layer 12. This form of apparatus wherein the embossing surface is prepared from a thin copper shell is particularly desirable for studying experimentally a number of point-bonding designs without excessive cost. The bosses 8 are preferably distributed uniformly on the surface of the sheet 11.

In the cross-section of a typical shell shown in FIGURE 2, the bosses 8 of the copper shell 11 are 0.25 mm. in diameter at their bases. The bosses may be slightly tapered (i.e. their sides form an angle of less than about 5° with the vertical axis of the boss). As described hereinafter, the total cross-sectional area of the bosses is measured at the bosses' base. When the bosses are tapered, the difference in area measured at top as compared to the base is less than about 20%. Each boss has a matching hollow area 9 on the opposite side of the shell. The bosses are about 0.9 mm. apart from center-to-center. They stand about 1 mm. high above the shell surface. The thin copper bosses are able to withstand pressures up to 20 kg. per linear cm. of roll length without collapsing. The high rigidity of the bosses is believed to be due to the small diameter of the cavities 9 and rigid support by the adhesive layer on the roll surface.

While the copper shell method is particularly useful for research purposes or for rapidly changing in manufacturing from one pattern to another, other types of embossing rolls may be used in operation of the process. It is obvious too that these may have a variety of embossing designs. The points need not necessarily be round providing they are of sufficient number and have the prescribed total cross-sectional area. For certain uses it may be desirable to perforate the sheet during or after embossing. When both sides of the sheet are treated, design patterns need not be the same on the two sides of the sheet.

The durometer hardness of resilient roll 4 should be within the limits 60 to 90 as determined by the Shore B test to give the proper control over the degree of penetration by the bosses. If the roll surface is too soft, the entire sheet tends to become fusion-bonded; if the roll surface is too hard, sheet perforation is likely to occur. A hard rubber roll is satisfactory for most operations. The Shore equipment for measuring durometer hardness is manufactured by Shore Instrument Manufacturing Co., Inc., 20–25 Van Wyk Expressway, Jamaica, New York, N.Y. The durometer test is described in ASTM Method D–1706–61 and in D–1484–59.

Figure 4:
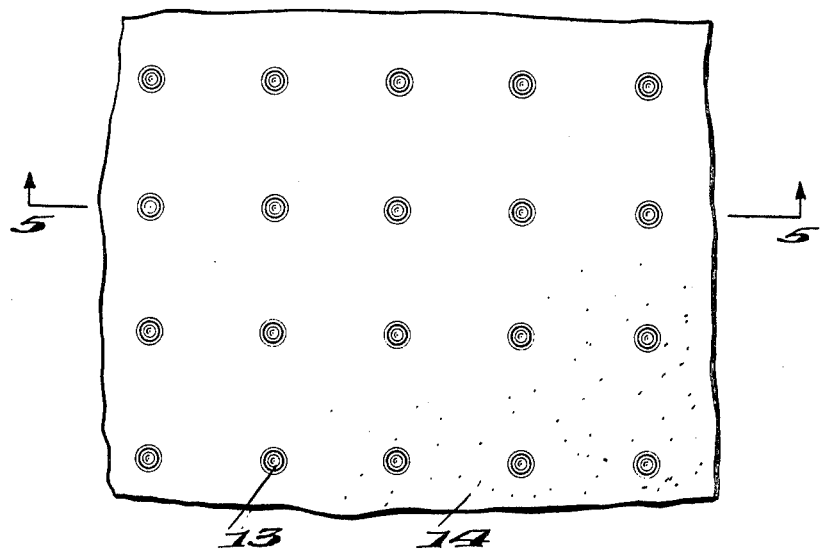
FIGURE 4 is a plan view enlarged about 12-fold of a non-woven sheet after treatment by the process of the invention.

FIGURE 4 shows a portion of one side of a sheet after treatment by the process of the invention. The delamination and abrasion resistance of the product is apparently improved over the raw sheet by means of the heat-fused points 13 which tie together the film-fibrils and which are derived from hot pressing between bosses 8 of roll 3 and resilient roll 4. In prior art processes fusion bonding of surface fibrils often occurred in the intervening areas 14 between the bosses. This bonding occurred when the bosses were short or the opposing roll so soft that the sheet was pressurized in the intervening areas by the action of the two cylindrical roll surfaces. In this case, surface fibrils in the intervening areas between bosses became partially heat-fused. Unfortunately this resulted in producing embossed sheets which could not be softened in subsequent operations. In the process of the invention softenability of the sheet is retained by critically selecting bosses which have a height at least 2.5 times the thickness of the sheet being embossed. This prevents formation of permanent bonds in the areas between bosses.

Figure 5:
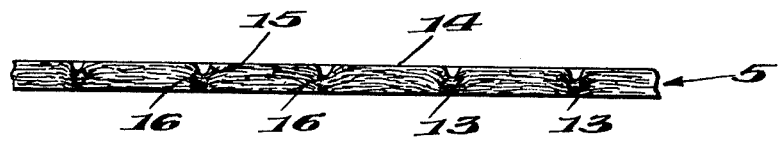
FIGURE 5 is a cross-sectional view enlarged about 12-fold of fabric after treatment, the view being taken along the lines 5—5 of FIGURE 4.
Figure 6:
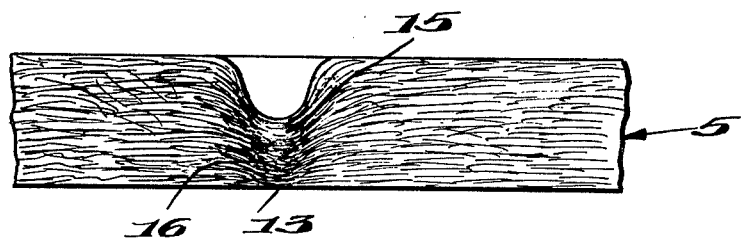
FIGURE 6 is an enlarged view of a portion of FIGURE 5.

In FIGURES 5 and 6 the cross-section of an embossed film-fibril sheet 5 is shown. The bond points 13 are translucent "windows" in the film-fibril sheet which are formed by pressure of the bosses 8 against resilient roll 4. The transparency is easily achieved because of the film-like construction of the film-fibril elements which are easily brought in intimate contact when pressed. The film-fibrils in the first surface 15 of the window (the surface nearest to the embossing roll) are fused together and the fibrils are inseparable. This situation promotes high abrasion resistance on the first side of the sheet. On the other hand fibrils on the second surface of the window 16 (the surface nearest the resilient roll during treatment) are lightly bonded and do not contribute much in the way of abrasion resistance on the second side of the sheet. The intervening areas 14 between the areas contacted by the bosses are also lightly bonded and not fused. This is more clearly seen in the enlarged FIGURE 6. For this reason it is necessary to reverse the sheet and provide a second treatment if high abrasion resistance is needed on both sides of the sheet. Alternatively one may provide two pairs of rolls, the second pair in opposite arrangement to the first pair.

The term "fused" as used herein refers to portions of the film-fibril sheet after it is exposed to sufficient heat and pressure to form a translucent window, but with insufficient exposure to melt all of the fibrils in that portion of the sheet. The translucent window is such that fibrils cannot be removed from the side closest to the heated boss, but may be removed from the side closest to the resilient roll. The translucent quality of the embossed area may be observed by the use of a small magnifying glass or with the unaided eye in the case of large areas. The fused portion appears to be cloudy because of opaque fibrils on the side of the window nearest the resilient roll but objects are discernible when observed through the window.

The term "lightly bonded" refers to portions of the film-fibril sheet which are still opaque. Fibrils may still be removed from these portions. It is seen from the above that the sides of the translucent windows are of two types: one side is "fused," and the other side is "lightly bonded."

The term "translucent window" refers to the above described bond points which consist of both fused and non-fused lightly bonded portions. These points are neither transparent nor opaque. The fused portions may be transparent, but the lightly bonded portions are opaque. The "windows" allow the passage of light but diffuse it so that although objects can be seen, they cannot be clearly distinguished.

In operation of the process with linear polyethylene sheets the steam temperature in the heated roll is usually between 150 and 185° C. Speeds of 5 to 75 meters per minute may conveniently be used. The temperature should not be high enough to cause sufficient melting of the sheet to allow perforation of the fabric. The pressure between the two rolls 3 and 4 during operation is generally between 4 and 20 kilograms/cm. depending on temperature and resilient roll hardness.

In order to get uniform abrasion resistance and other uniform properties, the bosses should be evenly distributed over the surface of the embossing roll. Preferably they should be in the from of parallelograms, squares, rectangles, or diamond patterns. In general, the distance between points should be no greater than about 0.18 cm. (center-to-center). The process of the invention can be used on a variety of film-fibril sheets providing they are prepared from finely divided materials. The necessary state of division is present when the starting sheet has a surface area of at least 2 m.²/g. The surface area/per unit weight is determined by exposure to liquid nitrogen as described by P. A. Faeth and C. B. Willingham in "Technical Bulletin on the Assembly, Calibration, and Operation of a Gas Adsorption Apparatus for the Measurement of Surface Area, Pore Volume Distribution, and Density of Finely Divided Solids," Mellon Institute of Industrial Research, September 1955. In this procedure, the surface area is calculated from the amount of nitrogen adsorbed by the sample at liquid nitrogen temperature by means of the Brunauer-Emmet-Teller equation using a value of 16.2 square angstroms for the cross-sectional area of the adsorbed nitrogen molecule.

In the examples which follow sheet properties are measured by means of the following methods, in which TAPPI indicates Technical Association of Pulp and Paper Industry and in which ASTM indicates American Society of Testing Materials:

Basis weight: TAPPI–T410 OS–61; ASTM D 646–50
Tensile: TAPPI–T404–M–50; ASTM D828–48
Tongue tear: TAPPI–T414–M–49; ASTM–39 part 19, 1958

The delamination resistance of the products should be above 0.35 lb./in., preferably above 0.45 lb./in. Delamination resistance is measured using an Instron Tester, 1 inch x 3 inch line contact clamps, and an Instron Integrator, all manufactured by Instron Engineering Inc., Canton, Mass. Delamination of a 1 inch x 7 inch specimen is manually started across a 1 inch x 1 inch edge area (so that the remaining 1 inch x 6 inch portion remains unseparated) by splitting the sheet with a pin. With a "C" load cell the following settings are used: gauge length of 4.0 inch, crosshead speed of 5.0 inch/minute, chart speed of 2.0 inch/minute, and full scale load of 2 lbs. One end of each of the split layers is placed in each of the line clamps and the force is measured which is required to pull the sheet apart. Delamination resistance (lb./in.) equals the integrator reading divided by 2500.

The abrasion resistance for examples which follow is determined by means of the Crockmeter tester of Atlas Electric Device Company, Chicago, Ill., CM–598. A sample is abraded against itself on the Crockmeter until the first surface fiber is disturbed (i.e., pops up). The abrasion resistance is reported as the number of cycles required to raise fibers from the surface of the sheet. The end point is determined visually. The abrasion resistance properties are reported as excellent, good, fair or poor. These terms correspond to greater than 13, 8 to 12, 4 to 7, and 3 or less cycles, respectively.

The examples which follow demonstrate the effect of treating both sides of the sheet. Similar effects are obtained with one-side bonding, but only the side of the sheet exposed to the embossing roll will have good abrasion resistance.

Sheets from the process of the invention may be used without further treatment if the ultimate in softness is not needed. However, if a high degree of softness is desired, this may be obtained by subjecting to flexing under water as in a domestic or commercial automatic washer. An alternative method comprises passing the sheet through a mechanical softener, such as by passing over a series of rolls having knobs or bosses which stroke the fabric to loosen it.

It is obvious that the sheet may also be subjected to further embossing, to dyeing operations, heat sealing of seams, and garment construction.

Examples I–XII

A linear polyethylene film-fibril sheet is prepared by the method described in Steuber, U.S. 3,169,899. The polymer is linear polyethylene having a density of 0.95 g./cm.$^3$ and a melt flow rate of 0.9 g./3 min. as determined by ASTM Method D–1238–57T, Condition E. The polymer is flash-spun from a 12.5% solution of trichlorofluoromethane. The solution is continuously pumped to a spinneret assembly at a temperature of 185° C. and a pressure above 1245 p.s.i.g. The solution is passed in the spinneret assembly through a first orifice to a pressure let-down zone and finally into the surrounding atmosphere. The resulting plexifilamentary strand is spread by means of a curved baffle and is then collected in multidirectional, overlapping, intersecting layers on a moving belt. The sheet is then passed through a pair of rolls 22 cm. in diameter which lightly consolidates the sheet at a pressure of 10 lbs. per inch of roll length. This raw material sheet is then treated in a number of ways by passing through a pair of embossing rolls as in FIGURE 1. The effect of various embossing designs and process conditions are shown in Table I.

Embossing patterns are prepared having a variety of designs. To simplify the process of preparing a number of rolls with several designs, the embossing patterns are each prepared on a flexible copper shell which is then fastened to the roll 3 of FIGURE 1. The bosses or raised portions of the copper shell extended outwardly from the roll surface. The bosses are all of the same height on the roll surface and are evenly spaced in a square pattern over the roll surface. The bosses are slightly tapered (i.e., less than about 5°) and had an approximately circular contact area at the top.

The copper shells are made using "Dycril" photopolymer printing plates. A desired embossing pattern (such as shown in FIGURE 4) is first drawn on a piece of paper and then photographed to prepare a negative film. "Dycril" is a registered trademark for an aluminum plate coated with a photosensitive polymer on one side. The "Dycril" plate is exposed to light through the negative film on the photosensitive side. A strong, hard polymeric material is formed by molecular cross-linking wherever the sheet is exposed to light. The areas exposed to no light or low-intensity light have no or little cross-linking and can be washed away by caustic. Thus, a "Dycril" plate with the desired embossing surface is obtained. A lead plate is molded to make the female image of the "Dycril" pattern by pressing it against the "Dycril" plate. Finally, a copper shell with a pattern identical to that of the "Dycril" plate is prepared by depositing copper on the lead plate using electro-plating technique. The thin copper shell is then peeled from the lead and mounted on a roll.

In preparing the point-bonded sheets of Table I the roll 3 having the embossed copper surface is used in combination with a resilient roll 4 covered with a rubber layer 2 cm. thick having a durometer hardness of 70.

Heat is provided to the roll 3 having the embossed pattern by means of pressurized steam. The diameter of the embossing roll is 30 cm. and the diameter of the resilient opposing roll is 30 cm. Temperatures and speeds for the treatments are shown in Table I. In each case the pressure exerted between the two rolls is sufficient to heat fuse the film-fibrils at the pressure points on one side of the sheet.

Various portions of the raw cold-rolled film-fibril sheet described above are exposed to each of the embossed roll patterns under the conditions shown in Table I. The basis weight for each portion of the sheet material is between 37 and 47 grams/m.$^2$ (1.1 to 1.4 oz./yd.$^2$). The various embossing patterns are described in Table I. In the Table "percent of area/side" is determined by measuring the total embossing surface of roll which is covered by the base of the bosses, dividing by the total treating area of the roll and multiplying by 100. It should be understood that the bosses taper to a cross-sectional area which is slightly less at the highest point on the boss. The sheet thickness indicated in the table is measured prior to embossing under a standard thickness gauge at a pressure of 500 to 600 g./cm.$^2$ (7 to 9 lbs./in.$^2$) temperatures shown in the table are steam temperatures in the embossing roll.

Examples I–IV in the table show desirable products and demonstrate the process of the invention. The other items, Examples V to XII, show properties obtained by using other embossing patterns. The products from Examples I to IV have high delamination resistance, i.e., above 0.35 lb./in. (62 g./cm.). Each of the four products is easily softened by subjecting to a washing operation in a domestic automatic washer. In other experiments, it is similarly shown that the four treated materials from Examples I–IV could be softened by passing through a "button-breaker" consisting of several motorized driven rolls with raised bosses. The rolls rotate faster than the sheet speed, and the bosses rapidly stroke the sheet passing over them. The softenability is further demonstrated by examining the drapeability and the noise level of sheets after the wash-softening or button-breaker softening process. As the sheets become softer the amount of noise generated by shaking or crumpling the sheet is dramatically reduced. Abrasion resistance is also greatly improved by the process for Examples I–IV, as measured by the crockmeter. Delamination resistance likewise is high. The products from Examples I–IV are particularly valuable for use in disposable garments such as swim trunks, or industrial garments.

TABLE I.—EFFECTS OF VARIOUS EMBOSSING PATTERNS ON NON-WOVEN SHEETS

| | Embossing Pattern | | | Processing Original Conditions | | | Sheet Properties | | | | |
|---|---|---|---|---|---|---|---|---|---|---|---|
| | Points, cm.² | Percent of Area side | Point Height, mm. | Sheet Thickness, mm. | Steam Temp., °C. | Speed, meter/min. | Tensile,[1] g./cm./g./m.² | Tongue[1] Tear, g./g./m.² | Delamination[1] Resistance, g./cm. | Softenability | Abrasion Resistance[1] |
| Process of the Invention: | | | | | | | | | | | |
| Example I | 31 | 4 | 1.0 | .15 | 164 | 9 | 50 | 28 | 121 | Good | Good. |
| Example II | 31 | 4 | 1.0 | .15 | 164 | 18 | 51 | 32 | 97 | do | Do. |
| Example III | 97 | 4 | .9 | .15 | 164 | 18 | 55 | 25 | 90 | do | Do. |
| Example IV | 97 | 4 | .9 | .15 | 164 | 27 | 50 | 29 | 84 | do | Do. |
| Other Processes: | | | | | | | | | | | |
| Example V | 97 | 44 | .5 | .15 | 164 | 20 | 87 | 15 | 84 | Poor | Excellent. |
| Example VI | 97 | 44 | .5 | .15 | 164 | 53 | 55 | 29 | 29 | Good | Good. |
| Example VII | 16 | 6 | .8 | .15 | 164 | 53 | 45 | 39 | 41 | Excellent | Poor. |
| Example VIII | 16 | 6 | .2 | .15 | 164 | 53 | 44 | 42 | 20 | Good | Fair. |
| Example IX | 16 | 2 | .8 | .15 | 164 | 20 | 53 | 37 | 57 | Fair | Poor. |
| Example X | 16 | 2 | .2 | .15 | 164 | 20 | 66 | 23 | 75 | Poor | Excellent. |
| Example XI | 11 | 3 | .6 | .15 | 159 | 37 | 44 | 44 | 20 | Good | Poor. |
| Example XII | 172 | 9 | .4 | .15 | 159 | 37 | 60 | 33 | 41 | do | Fair. |

[1] Measured before softening.

The product of the present invention has the many general uses well-known for film-fibril sheets. Due to the improved delamination and abrasion resistance properties, the utility is greatly enhanced.

We claim:

1. A process for embossing a nonwoven, randomly-laid film-fibril sheet comprising:
   (1) providing a film-fibril linear polyethylene sheet having a surface area of at least 2 meter²/gram, a sheet thickness in the range of 0.07 to 0.40 mm. and an overall density of 0.1 to 0.4 gram/cm.³ and forwarding said sheet at a speed of 5 to 75 meters per minute, and
   (2) applying heat and pressure to said sheet by contacting one surface thereof at 30 to 170 points/cm.² throughout the area of said sheet, said points comprising 1 to 5% of the area of said sheet and being defined by the nip of a pair of cooperating rolls, said heat being applied by contact with a zone maintained in the range of from about 150 to about 185° C., and said pressure being in the range of between about 4 to about 20 kilograms/cm., said heat and pressure of sufficient extent and duration to fuse the contacted portions of said one surface of said sheet to produce translucent windows at the said points and lightly bond the remaining portions of said sheet.

2. The process of claim 1 wherein said pressure is supplied by said pair of cooperating rolls adapted and arranged to continuously receive said sheet and apply heat and pressure thereto; the first of said rolls having a heat-conductive surface, said surface containing hard bosses, said bosses extending from the surface of the roll to a height of at least 2.5 times the thickness of said sheet, the second of said rolls having a resilient surface with a durometer hardness between 60 and 90.

3. The process of claim 1 further comprising, after the said step (2), applying heat and pressure to said sheet by contacting the other surface thereof at 30 to 170 points/cm.² throughout the area of said sheet distinct from the points contacted in step (2), said points comprising 1 to 5% of the area of said sheet and being defined by the nip of a pair of cooperating rolls, said heat being applied by contact with a zone maintained in the range of from about 150 to about 185° C., and said pressure being in the range of between about 4 to about 20 kilograms/cm., said heat and pressure of sufficient extent and duration to fuse the contacted portions of the other surface of said sheet to produce translucent windows at the said points without fusing the other portions of said sheet.

References Cited

UNITED STATES PATENTS

| 1,983,464 | 12/1934 | Kitchen | 264—284 |
| 2,464,301 | 3/1949 | Francis | 264—284 |
| 2,890,700 | 6/1959 | Lönberg-Holm. | |
| 3,169,899 | 2/1965 | Steuber. | |
| 3,150,416 | 9/1964 | Such | 264—128 |
| 3,255,064 | 6/1966 | Makansi | 264—119 |
| 3,286,007 | 11/1966 | Wilkie et al. | 264—119 |

FOREIGN PATENTS 950,262    1964    Great Britain.

ROBERT F. WHITE, Primary Examiner

J. R. THURLOW, Assistant Examiner

U.S. Cl. X.R.

156—166, 209; 161—73; 264—119, 175, 293, 294, 319